US010697517B2

(12) United States Patent
Snir et al.

(10) Patent No.: US 10,697,517 B2
(45) Date of Patent: Jun. 30, 2020

(54) MODULAR MULTIENGINE SYSTEM

(71) Applicants: Shamir Shmuel Snir, Kadima (IL); Shimshon Nagar, Netanya (IL)

(72) Inventors: Shamir Shmuel Snir, Kadima (IL); Shimshon Nagar, Netanya (IL)

( * ) Notice: Subject to any disclaimer, the term of this patent is extended or adjusted under 35 U.S.C. 154(b) by 93 days.

(21) Appl. No.: 15/528,842

(22) PCT Filed: Jul. 21, 2016

(86) PCT No.: PCT/IL2016/050795
§ 371 (c)(1),
(2) Date: May 23, 2017

(87) PCT Pub. No.: WO2017/013656
PCT Pub. Date: Jan. 26, 2017

(65) Prior Publication Data
US 2017/0321784 A1 Nov. 9, 2017

Related U.S. Application Data

(60) Provisional application No. 62/251,212, filed on Nov. 5, 2015, provisional application No. 62/195,566, filed on Jul. 22, 2015.

(51) Int. Cl.
*F16H 1/22* (2006.01)
*F16H 57/033* (2012.01)
(52) U.S. Cl.
CPC ............. *F16H 1/22* (2013.01); *F16H 57/033* (2013.01)
(58) Field of Classification Search
CPC ... F16H 1/22; F16H 57/033; F16H 2057/0335
(Continued)

(56) References Cited

U.S. PATENT DOCUMENTS 1,292,592 A 1/1919 Ferris
1,309,451 A * 7/1919 Bechereau ............ F16H 49/001
74/665 D
(Continued)

FOREIGN PATENT DOCUMENTS

CN 102801279 A 11/2012
CN 204387223 U 6/2015
(Continued)

*Primary Examiner* — William C Joyce
(74) *Attorney, Agent, or Firm* — Browdy and Neimark, P.L.L.C.

(57) ABSTRACT

A modular multi-engine system having a plurality of engines and a plurality of gear units each gear unit having at least one rotatable member and a drive shaft being driven by one of the plurality of engines, where at least one of the gear units is a main gear and the other peripheral gear unit(s). Each rotatable member of each gear unit engages at least one other rotatable member of an adjacent gear unit such as to ultimately transfer torque from all the engines operable in said modular multiengine system to an output drive shaft connected to said main gear unit. The rotatable member of at least one of the peripheral gear units is located at a different height than at least one other cogwheel of another gear unit. The main gear unit includes an upper rotatable member and a lower rotatable member coaxially connected being operatively associated via at least one transmission unit configured and located such as to transfer torque from the upper or lower rotatable member to the other lower or upper rotatable member, respectively.

5 Claims, 18 Drawing Sheets

(58) Field of Classification Search
USPC ........ 74/661, 665 B, 665 L, 665 N; 310/112; 123/DIG. 8; 290/4 C
See application file for complete search history.

(56) References Cited

U.S. PATENT DOCUMENTS

| | | | | |
|---|---|---|---|---|
| 2,215,646 A | * | 9/1940 | Kuhns | ............... H02K 16/00 |
| | | | | 290/4 R |
| 2,419,305 A | | 4/1947 | Woolson et al. | |
| 3,151,502 A | * | 10/1964 | Kron | .................. C21C 5/50 |
| | | | | 74/665 B |
| 3,168,665 A | | 2/1965 | Holper | |
| 3,390,670 A | * | 7/1968 | Brice | .................. F02B 65/00 |
| | | | | 123/197.1 |
| 3,575,621 A | | 4/1971 | Voland et al. | |
| 4,177,693 A | | 12/1979 | Ivanko et al. | |
| 4,632,081 A | * | 12/1986 | Giuliani | ............... F01B 1/12 |
| | | | | 123/198 F |
| 4,691,119 A | | 9/1987 | McCabria | |
| 5,463,914 A | * | 11/1995 | Tyan | ............... F16H 1/227 |
| | | | | 74/414 |
| 8,912,681 B1 | | 12/2014 | Filkins | |
| 2010/0323836 A1 | * | 12/2010 | Wang | ................ F16H 1/46 |
| | | | | 475/1 |
| 2015/0111752 A1 | * | 4/2015 | Guina | ............... H02K 31/00 |
| | | | | 505/163 |

FOREIGN PATENT DOCUMENTS

| | | | |
|---|---|---|---|
| DE | 44 02 337 | * | 8/1995 |
| DE | 10315833 A1 | | 10/2014 |
| EP | 2 209 188 B1 | | 4/2019 |
| GB | 395423 A | | 7/1933 |
| GB | 2490816 A | | 11/2012 |
| JP | 7243485 A | | 9/1995 |
| JP | HO9-46969 A | | 2/1997 |
| JP | 2004-96893 A | | 3/2004 |

* cited by examiner

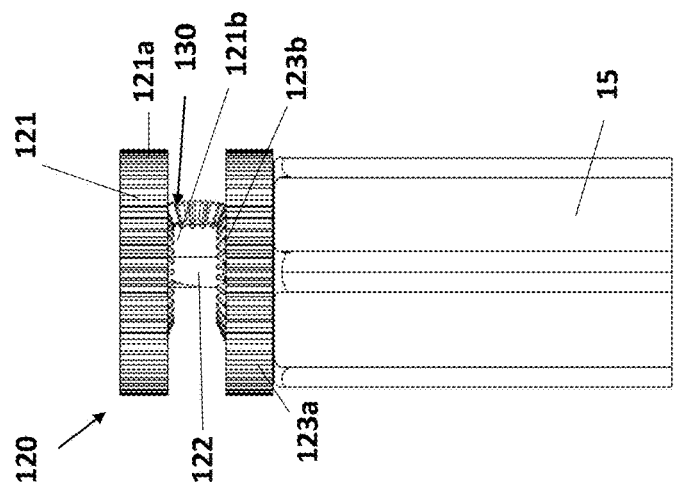
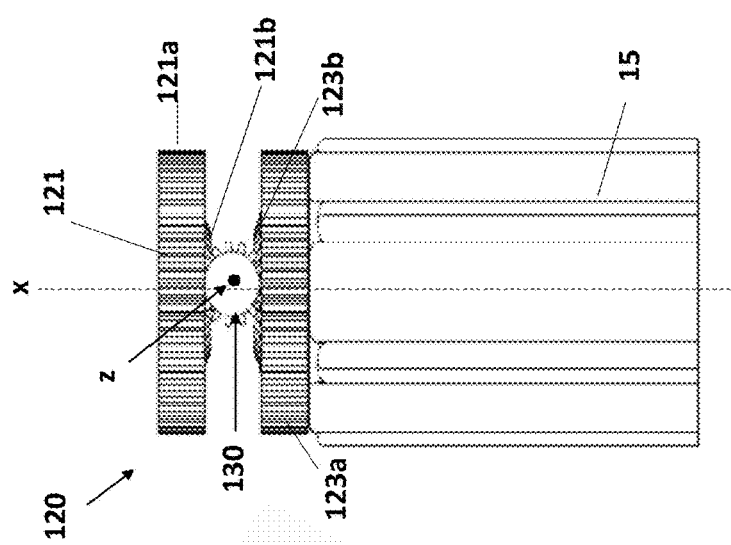
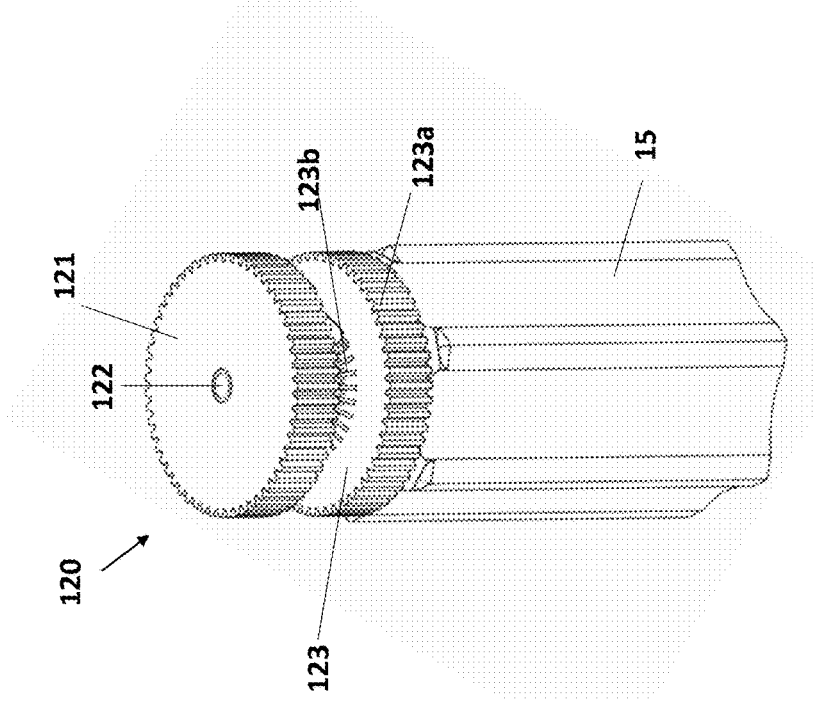
Fig. 17C
Fig. 17B
Fig. 17A

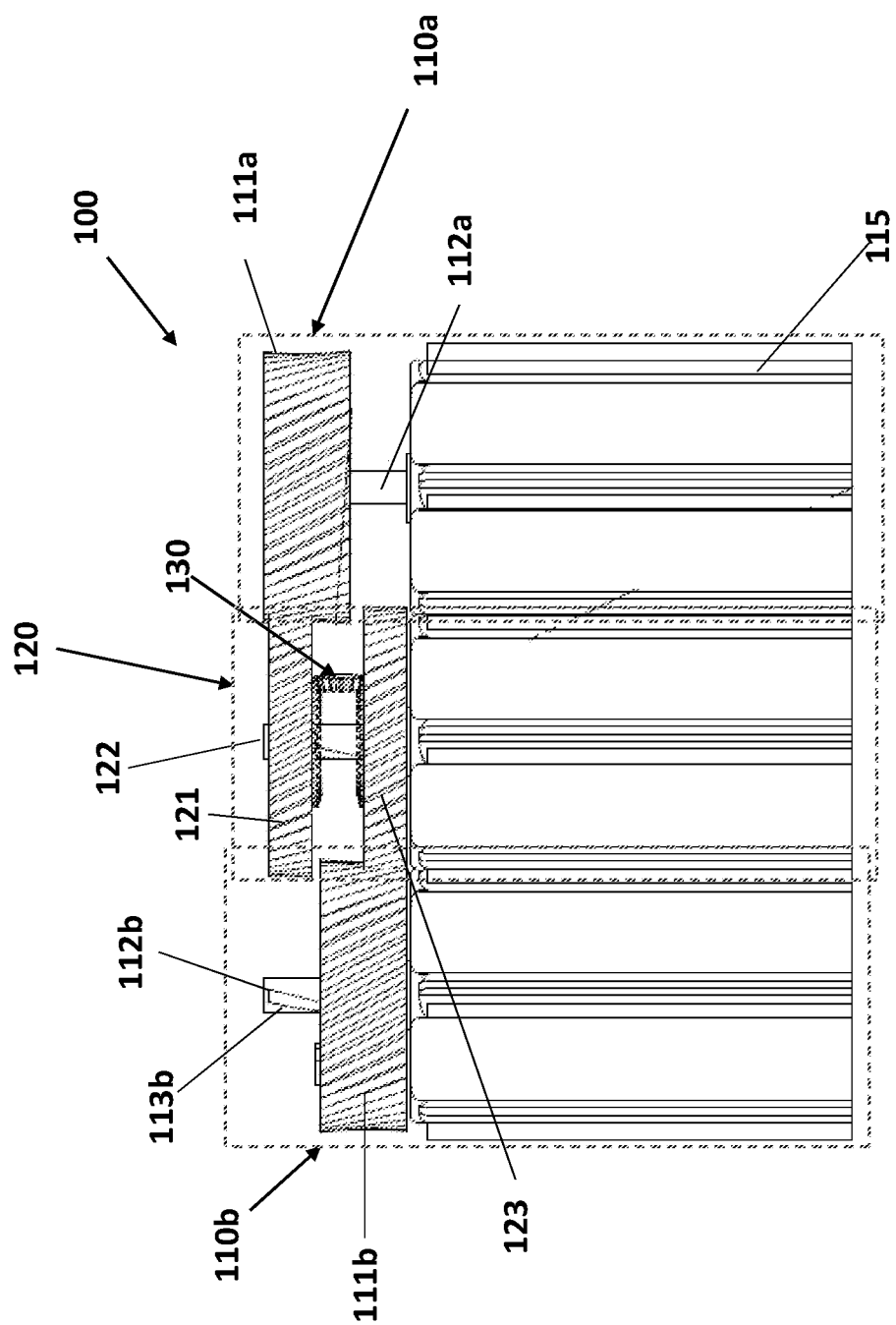

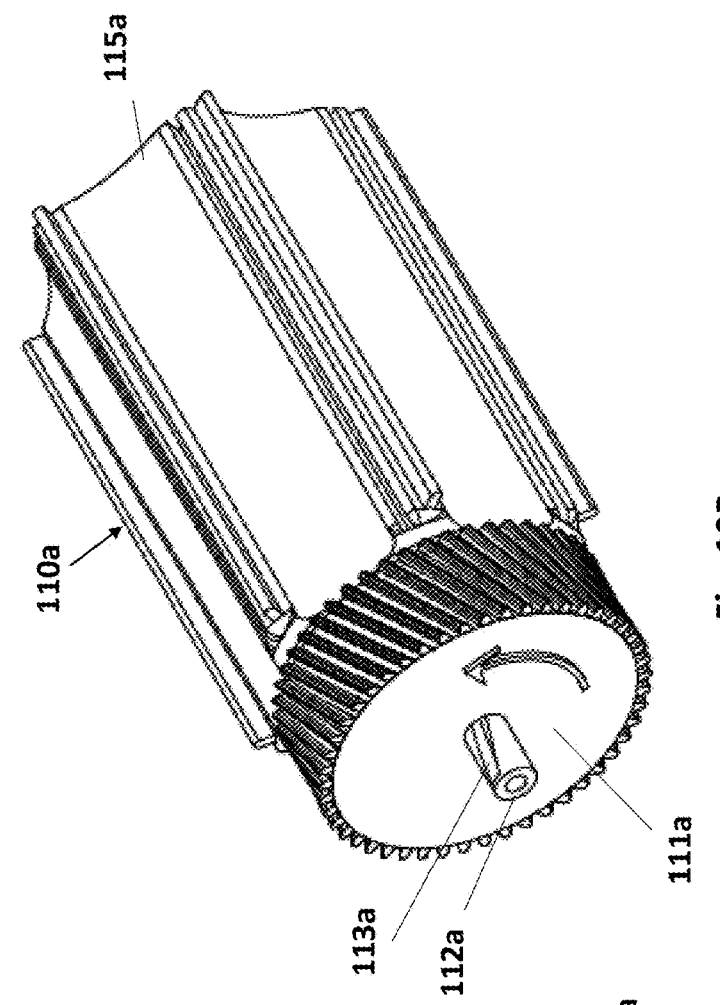
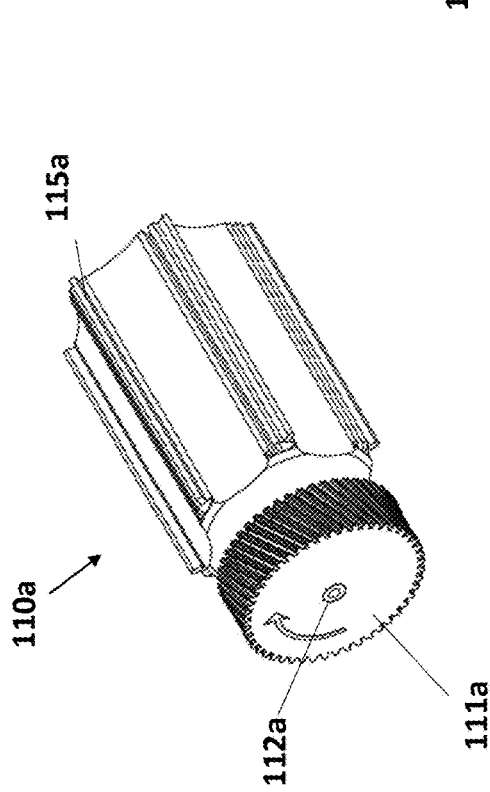
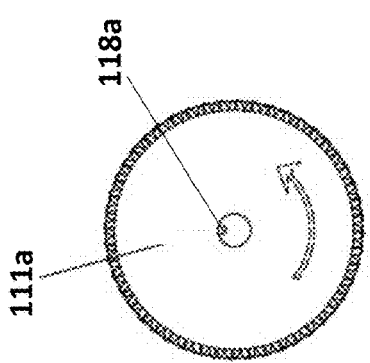
Fig. 19A
Fig. 19B
Fig. 19C

MODULAR MULTIENGINE SYSTEM

FIELD OF THE INVENTION

The present invention generally relates to multiengine systems and more particularly to modular multiengine systems.

BACKGROUND OF THE INVENTION

U.S. Pat. No. 2,419,305 teaches multiple engine power plants, and particularly to a power plant which comprises a number of high production, small horsepower engines assembled on a common crankcase. The engine clocks are secured to the case by hold-down bolts and the engines are arranged in radial circumferentially spaced relation with respect to the longitudinal central axis of the case. The spacing being such that the engines and their accessories are readily accessible.

Patent application no. GB395423 teaches a system having a number of radial-cylinder-stationary or revolving-engines driving a common propeller shaft that are mounted between endplates, which are connected by a tube through which the shaft passes. Each engine is held on to the plates by bolts passing through a collar and a belt. The drive from the engine crank shafts to the propeller shaft is by chain spur or bevel gear; a clutch may be interposed in each transmission. In all cases, irrespective of the arrangement of the elementary engines amongst themselves the transmission of the power of these engines to the common shaft is effected by transmission members, chain wheels or gear pinions, separate for each elementary engine.

Patent application no. DE10315833 teaches a frictional connection between crankshafts for a slider crank drive and drive or driven mechanism through a device incorporating all rigid shaft axes by means of in-phase cranks.

SUMMARY OF THE INVENTION

The present invention discloses a modular multiengine system comprising: a plurality of instantly Attachable Modules, enabling instant, flexible, configurable assembly and shaping of a multiple-engine cluster, each Attachable Module comprising:
a. at least one engine and
b. at least one rotatable gear unit driven by the said at least one engine through a drive shaft, and
c. a frame housing, encompassing the said at least one engine and the at least one rotatable gear unit,
wherein the Attachable Modules' frame housings facilitates the instant attachment of adjacent Attachable Modules through their respective frame housings,
wherein the gear unit within at least one of the Attachable Modules comprises at least two rotatable members: at least one upper rotatable member and at least one lower rotatable member,
wherein each of said gear units' rotatable members engage at least one other adjacent rotatable member in an adjacent Attachable Module, such as to ultimately transfer torque from all the engines operable in said modular multiengine system to an output drive shaft connected to at least one Attachable Module's gear unit.

According to some embodiments of the present invention the said upper and lower rotatable members are coaxially connected to the drive shaft of at least one Attachable Module's gear unit, are operatively associated via at least one transmission unit configured and located such as to transfer torque from the upper or lower rotatable member to the other lower or upper rotatable member respectively, and rotate in opposite directions, According to some embodiments of the present invention the transmission unit engages the lower and upper rotatable members through the slanted toothed extensions.

According to some embodiments of the present invention the system further comprising an Attachable Module which incorporates a rotatable gear unit, of which the height is adjustable by having at least one stopper pin attached to an inner wall of its cogwheel, and by having an upper portion of its drive shaft grooved for allowing the adjustment of the location of the cogwheel over the drive shaft, and therefore the cogwheel height by allowing the pin to be directed through the drive shaft groove.

According to some embodiments of the present invention the said frame housing is constructed as a regular polygon, facilitating the repetitive attachment of Attachable Modules to construct a repetitive modular structure. The present invention provides a modular multiengine system comprising: a plurality of instantly attachable Modules, enabling flexible, configurable, instant assembly and shaping of a multiple-engine cluster, each attachable Module comprising:
a. at least one engine
b. at least one main gear unit which is driven by the at least one engine through a drive shaft;
c. at least one rotatable satellite gear unit which engages the said main gear unit; and
d. a frame housing, encompassing the said at least one engine and the at least one rotatable main gear unit, and the at least one rotatable satellite gear unit
wherein the Attachable Modules' frame housings facilitates the instant attachment of adjacent Attachable Modules through their respective frame housings,
wherein each of said rotatable satellite gear units within one Attachable Module engages at least one main rotatable gear unit of an adjacent Attachable Module, such as to ultimately transfer torque from all the engines operable in said modular multiengine system to an output drive shaft connected to at least one of said main gear units.

According to some embodiments of the present invention the torque is transferred between rotatable satellite gear units and main rotatable gear units by means of a friction wheels, toothed gear wheels, or any combination thereof.

According to some embodiments of the present invention the system further comprising transmission gears of various diameters such as to change the ratio of speed and torque transmission between adjacent engines within the multi-engine cluster.

According to some embodiments of the present invention at least one Attachable Module incorporates a rotatable gear unit of a larger diameter and a frame housing of fractal shape, thus multiplying the number of adjacent Attachable Module's gear units that could be engaged to its own main gear unit.

According to some embodiments of the present invention the system of further comprising an Attachable Module which incorporates at least two engine units, serially located one beneath the other, each individually engaged to satellite gear units, thus enabling attachment of adjacent Attachable Modules in different heights, in respect to each of the serially located engine units. According to some embodiments of the present invention at least one engine is a dual shaft engine, thus transferring torque between the at least two engines and to a shaft drive connected to the upper-most engine.

BRIEF DESCRIPTION OF THE DRAWINGS

FIG. 16A shows an elevated perspective view of the modular multiengine system; and FIG. 16B shows a side view of the modular multiengine system.

FIGS. 17A-17C present different views of an Attachable Module incorporating a transmission gear unit which transfers torque between parallel cogwheels residing in different planes.

FIG. 17A shows an elevated perspective view of the said Attachable Module

FIG. 17B shows a frontal view of the said Attachable Module

FIG. 17C shows a side view of the said Attachable Module

FIG. 18 presents a simplified side view of a multi-engine cluster, incorporating three Attachable modules, according to some embodiments of the present invention.

FIGS. 19A-19C show an Attachable module incorporating a rotatable gear unit. The height of the rotatable gear unit is adjustable by having at least one stopper pin attached to an inner wall of its cogwheel and by having an upper portion of its drive shaft grooved for allowing the adjustment of the location of the cogwheel over the drive shaft and therefore the cogwheel height by allowing the pin to be directed through the drive shaft groove.

FIG. 19A shows a perspective view of the Attachable module in a state in which the cogwheel thereof is set at the highest position at the highest edge of the Attachable module's drive shaft FIG. 19B shows a perspective view of the Attachable module in a state in which the cogwheel thereof is set at the lowest position at the lowest edge of the Attachable module's drive shaft FIG. 19C shows elevated top view of the Attachable module showing a protrusion located in the inner walls of the cogwheel designed to being inserted and directed through a designated groove incised over the upper portion of the drive shaft of the Attachable module.

DETAILED DESCRIPTION OF SOME EMBODIMENTS OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Following is a table of definitions of the terms used throughout this application.

| Term | Definition |
| --- | --- |
| Multiple engine cluster | A cluster of engines engaged through Attachable Modules, so as to transfer torque from all the engines within the cluster to an output drive shaft connected to at least one Attachable Module's gear unit. |
| Attachable Module | The basic building block of the multiple engine cluster. It is comprised of:<br>1. at least one engine<br>2. at least one main gear unit which is driven by the at least one engine through a drive shaft<br>3. rotatable satellite gear units which engage the said main gear unit according to some embodiments of the present invention<br>4. a frame housing, encompassing the said at least one engine and the at least one rotatable main gear unit, and the at least one rotatable satellite gear unit<br>Attachable Modules' frame housings facilitate instant attachment of adjacent Attachable Modules through their respective frame housings, |

The present invention provides a method for construction of multi-engine clusters, facilitated by instantly engaging Attachable Modules. Each such Attachable module incorporates at least one engine and other required rotatable members, rotating in different directions, such as to ultimately combine the torque of all engines in the cluster onto at least one output engine drive shaft.

Figure 1:
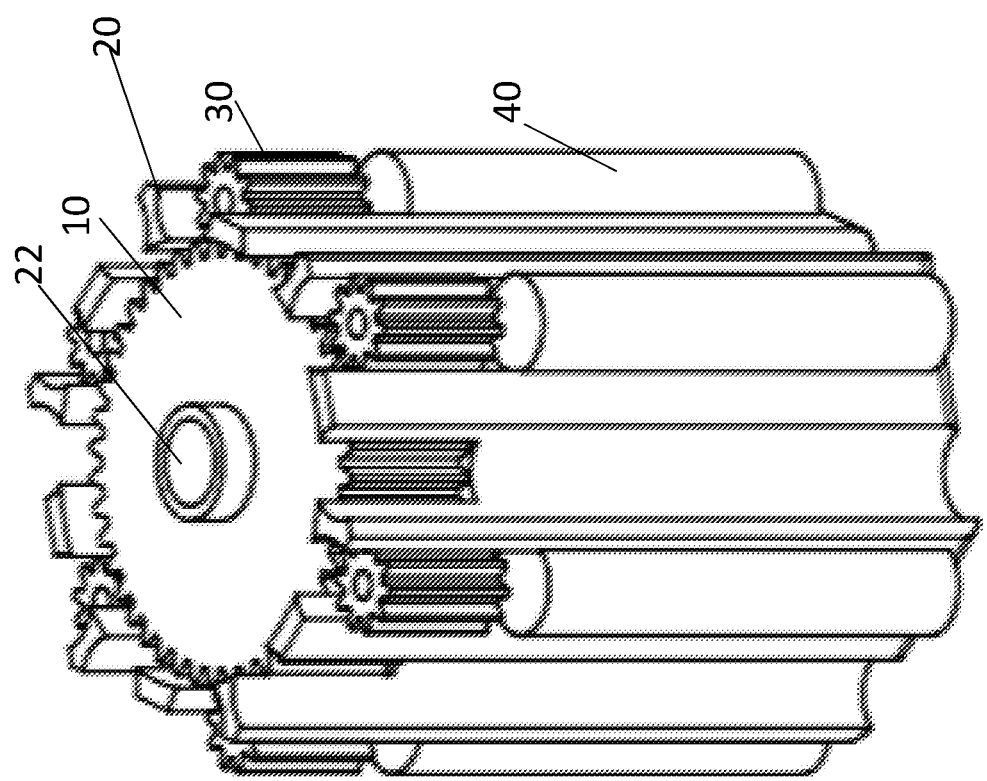
FIG. 1 schematically illustrates a perspective view of a single Attachable Module unit incorporating a motor and gear mechanism according to some embodiments of the present invention.

The multiengine system is modular in the sense that it facilitates changing of:
- The number of Attachable modules that partake in the multi-engines cluster
- The Attachable modules' spatial arrangement in relation to each another
- The location of torque emitting output drive shafts The different embodiments of the present invention portray variations in the structure of the Attachable Modules, and in the means and forms of attaching these modules so as to combine the torque of all engines in the multi-engine cluster FIG. 1 schematically illustrates a perspective view of an Attachable module, incorporating an engine and a gear mechanism according to some embodiments of the present invention. Each Attachable Module is comprised of:
- At least one engine (hidden in FIG. 1)
- A gear mechanism 10 installed on the engine drive shaft 22. This gear mechanism is referred to as the Attachable module's 'main' gear mechanism. It may be comprised of a single cogwheel, or of a more complex transmission gear mechanism, in accordance to some embodiments of the present invention as elaborated below.
- A housing frame 20. The housing frame may be shaped as a regular polygon according to some embodiments of the present invention. In this example the frame housing is shaped as a hexagon, thus enabling the construction of repetitive honeycomb multi-engine structures.
- According to some embodiments of the present invention, each face of the housing hosts at least one satellite gear 30 mounted on a base 40 to be rotationally engaged with the main gear 10 of another Attachable Module unit.

The Attachable Module units can be attached to each other at any order to construct various shapes according to design requirements. The attachment of the engine units may be implemented using male-female connectors of any type.

Figure 2:
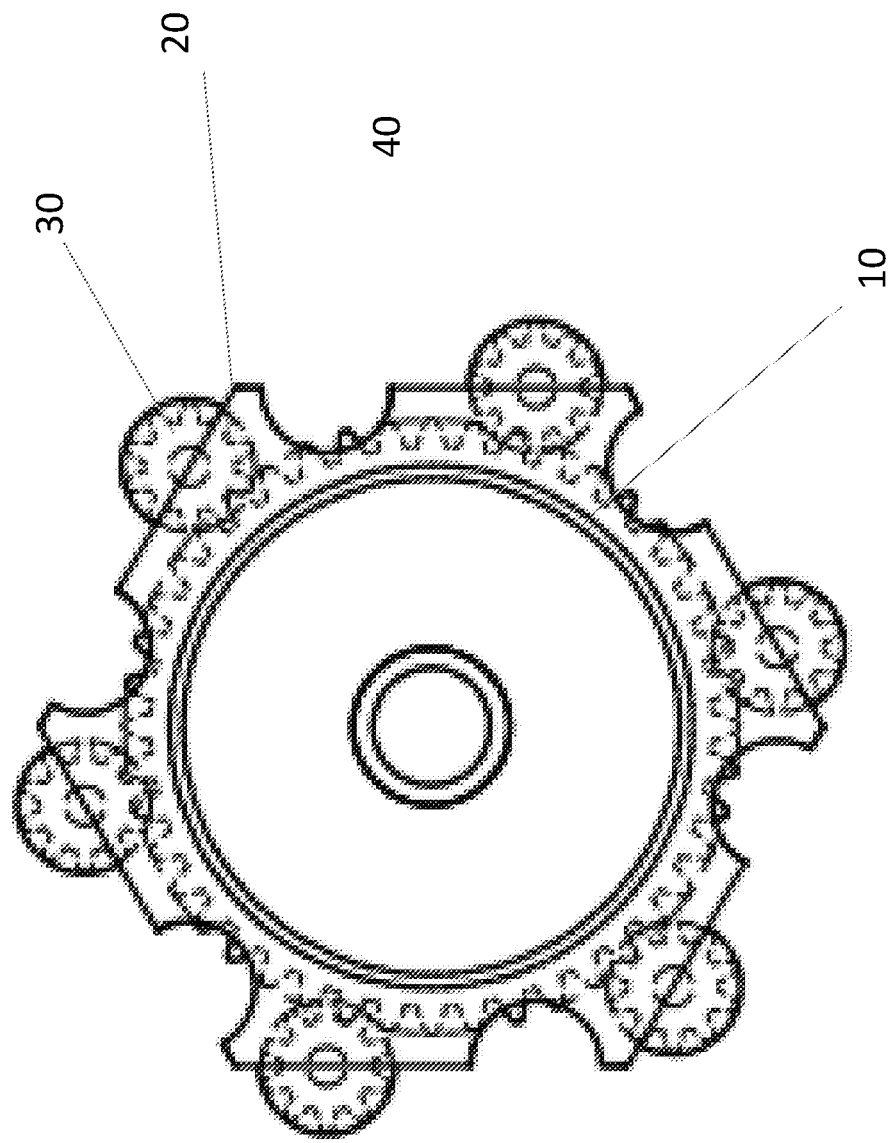
FIG. 2 schematically illustrates a top view of a single Attachable Module unit incorporating a motor and gear mechanism according to some embodiments of the present invention.

FIG. 2 schematically illustrates a top view of a single Attachable Module unit incorporating a motor, a frame housing, a main gear unit and satellite gear units according to some embodiments of the present invention.

Figure 3:
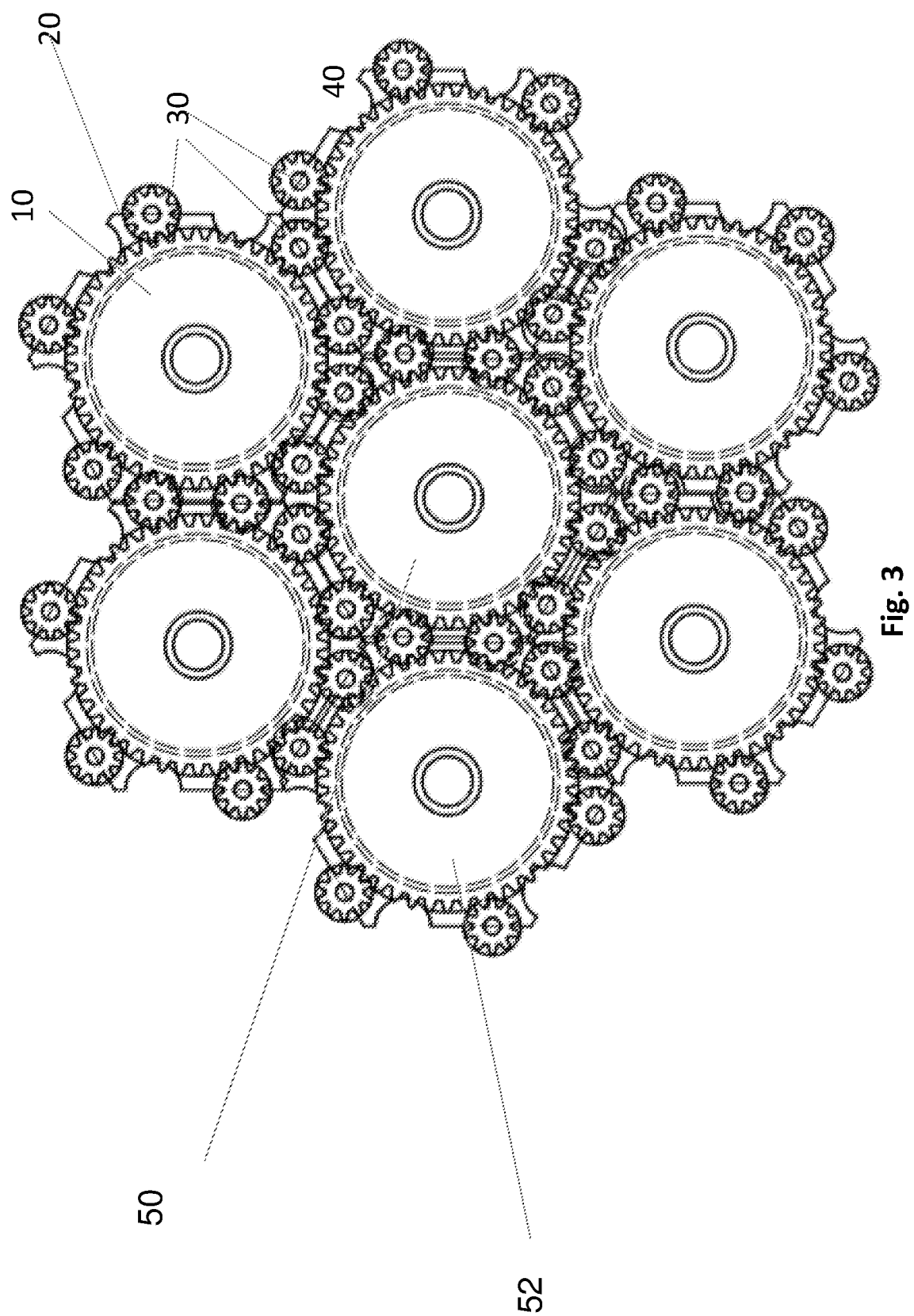
FIG. 3 schematically illustrates a top view of a multiple Attachable Modules engagement structure, having gear mechanism according to some embodiments of the present invention.

FIG. 3 schematically illustrates a top view of a multiple Attachable Modules engagement structure, having gear mechanism according to some embodiments of the present invention.

This figure depicts an example of multiple hexagon-shaped Attachable Modules, engaged in a honeycomb structure of seven Attachable Modules. In this example, a central Attachable Module 50 is attached to six other Attachable Modules 52, one at each face of the central unit. As shown in this example, every two Attachable Modules are engaged by two satellite gears 30, and each Attachable Module can attach to up to 6 other engine units.

The multiple engine cluster utilizes at least one engine unit as a source of torque. Each additional engine unit contributes to the overall torque that is output on at least one drive shaft connected to at least one Attachable Module's gear unit.

According to some embodiments of the present invention each modular engine system unit has self-powered intake, or optionally power intake is propagated between engine units connected to the engine structure.

According to some embodiments of the present invention at least one of the engine units incorporates a control input. This control may be propagated to each of the engines units within the multiple-engine cluster.

According to some embodiments of the present invention, each Attachable module may incorporate a proprietary energy source (e.g. a battery) embedded in the frame housing. The electric power may optionally be propagated between the engine units within the multiple-engine cluster.

Figure 4B:
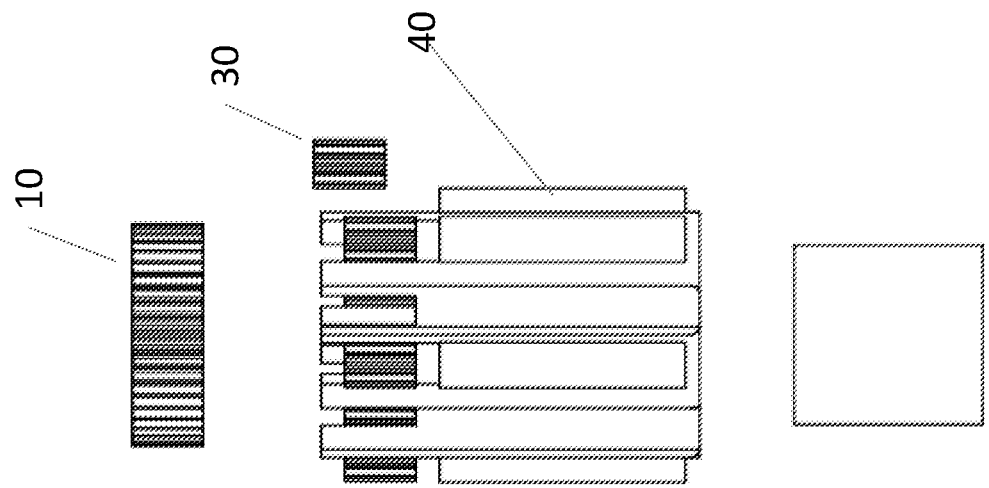
FIG. 4B schematically illustrates a side exploded view of a single Attachable Module unit having gear mechanism according to some embodiments of the present invention.
Figure 4A:
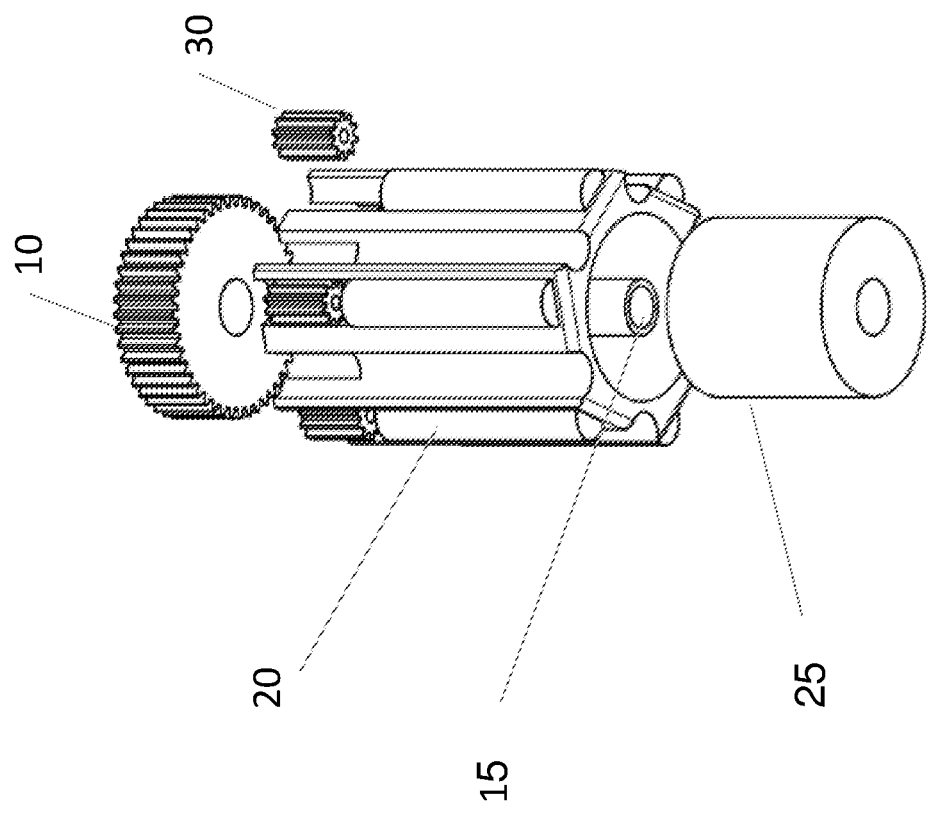
FIG. 4A schematically illustrates a perspective exploded view of a single Attachable Module unit having gear mechanism according to some embodiments of the present invention.

FIG. 4A schematically illustrates a perspective exploded view of a single Attachable Module according to some embodiments of the present invention. The Attachable Module is comprised of an engine 25, a drive shaft 15, a main gear unit (a single cogwheel in this example) 10, a housing frame 20 and satellite gear units 30.

FIG. 4B schematically illustrates a side exploded view of a single Attachable Module according to some embodiments of the present invention.

Figure 5:
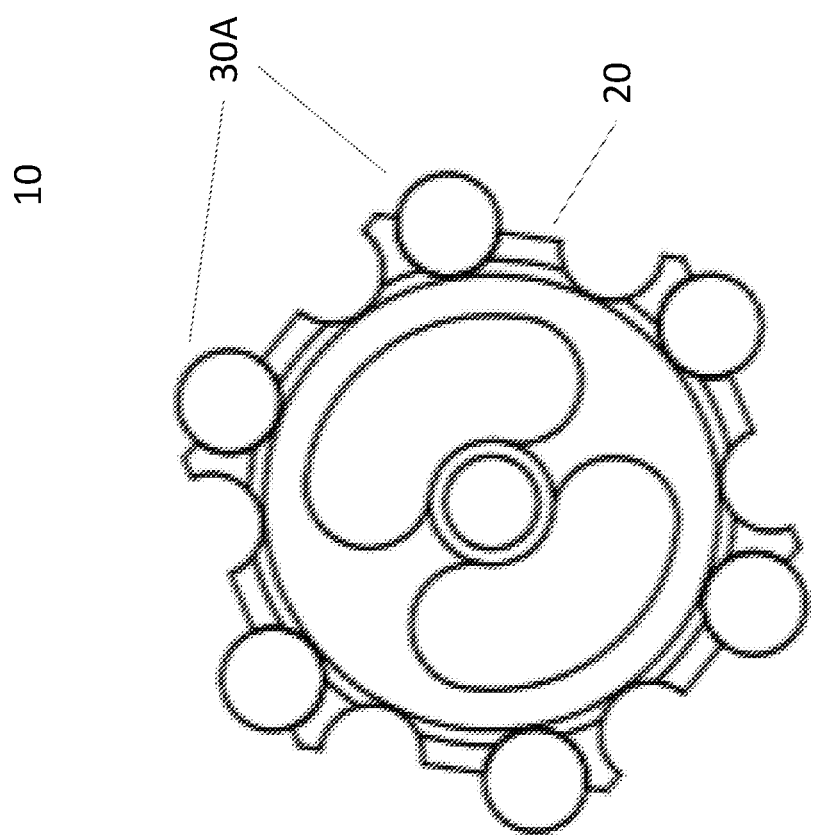
FIG. 5 schematically illustrates a top view of a single Attachable Module, incorporating friction gears according to some embodiments of the present invention.

FIG. 5 schematically illustrates a top view of a single Attachable Module, incorporating friction gears according to some embodiments of the present invention.

According to this embodiment, the engine units are engaged by satellite rotating friction gears 30A and rotating disc 10A.

Figure 6B:
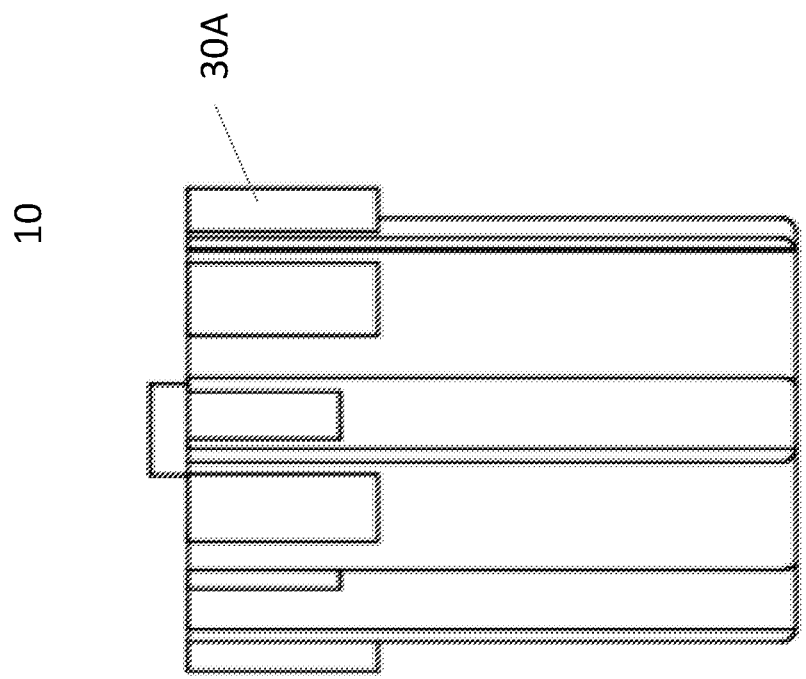
FIG. 6B schematically illustrates a side view of a single Attachable Module unit according to some embodiments of the present invention.
Figure 6A:
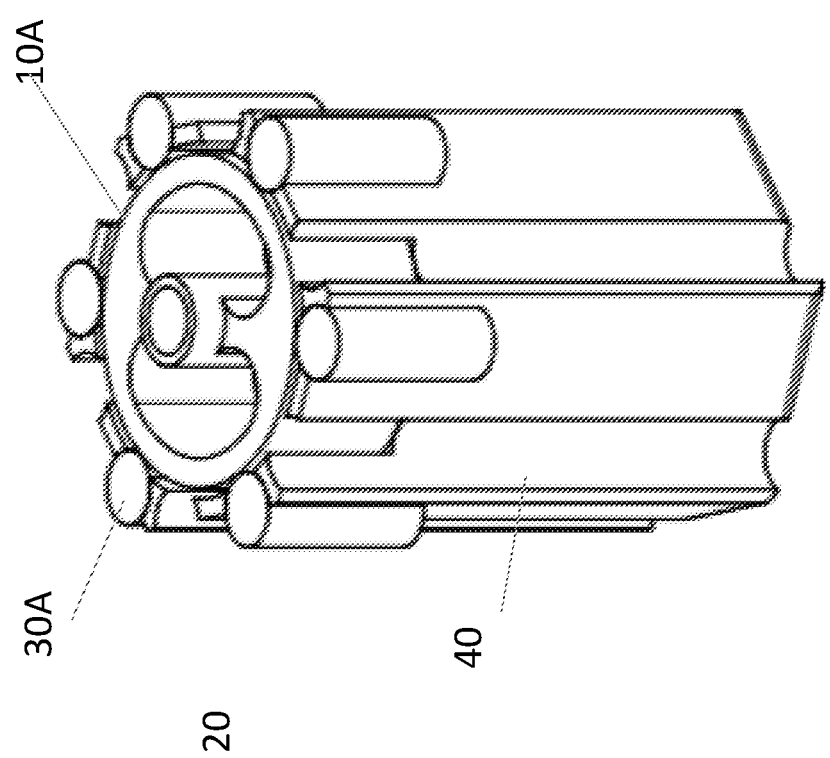
FIG. 6A schematically illustrates a perspective view of a single Attachable Module unit according to some embodiments of the present invention.

FIG. 6A schematically illustrates perspective view of a single Attachable Module, incorporating friction gears according to some embodiments of the present invention.

FIG. 6B schematically illustrates a side view of a single Attachable Module, incorporating friction gears according to some embodiments of the present invention.

Figure 7:
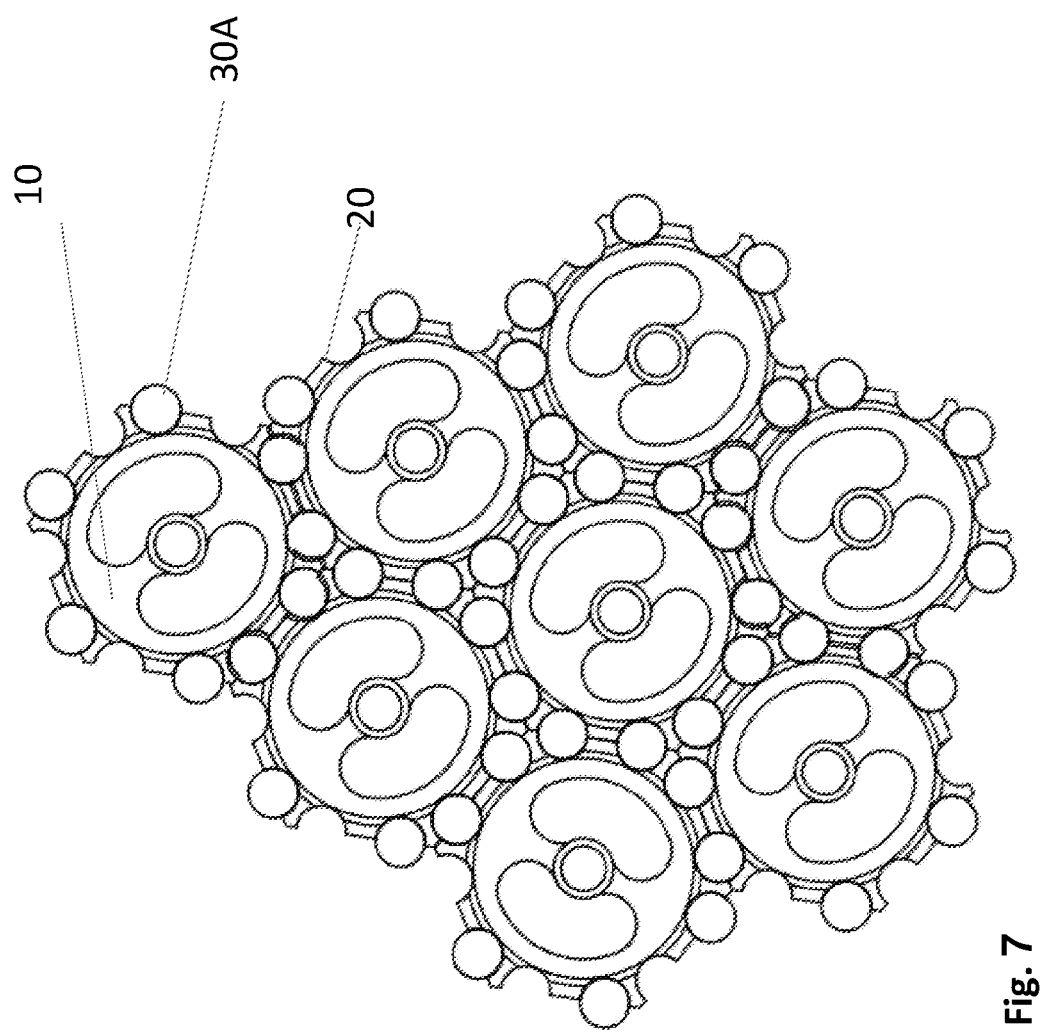
FIG. 7 schematically illustrates a top view of multiple Attachable Module units engagement structure according to some embodiments of the present invention.

FIG. 7 schematically illustrates a top view of a multiple engine cluster incorporating a friction mechanism according to some embodiments of the present invention. In this example, eight engine units are engaged via the friction mechanism.

Figure 8:
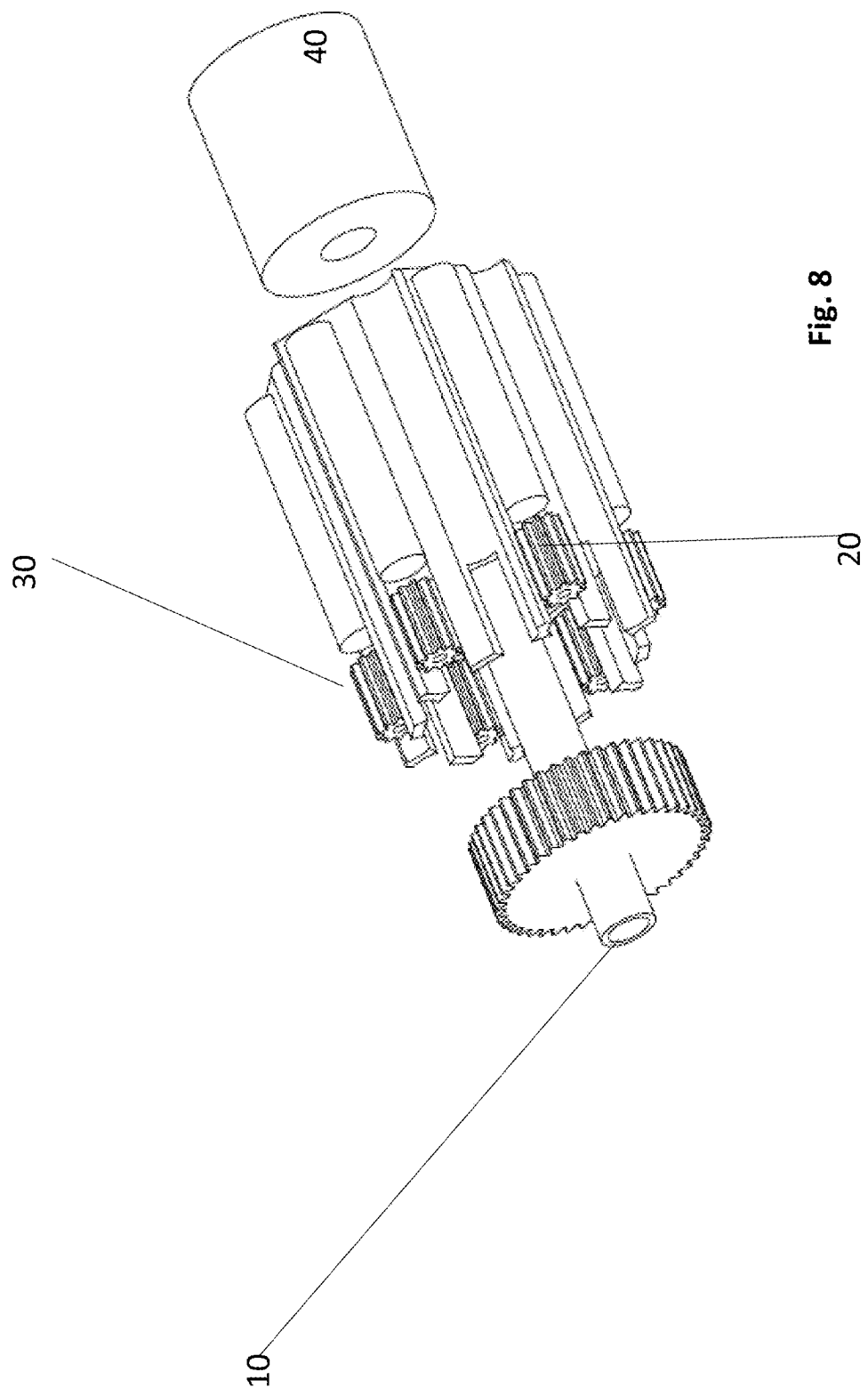
FIG. 8 schematically illustrates a perspective exploded view of a single Attachable Module unit according to some embodiments of the present invention.

FIG. 8 schematically illustrates a perspective exploded view of a single Attachable Module according to some embodiments of the present invention.

Figure 9:
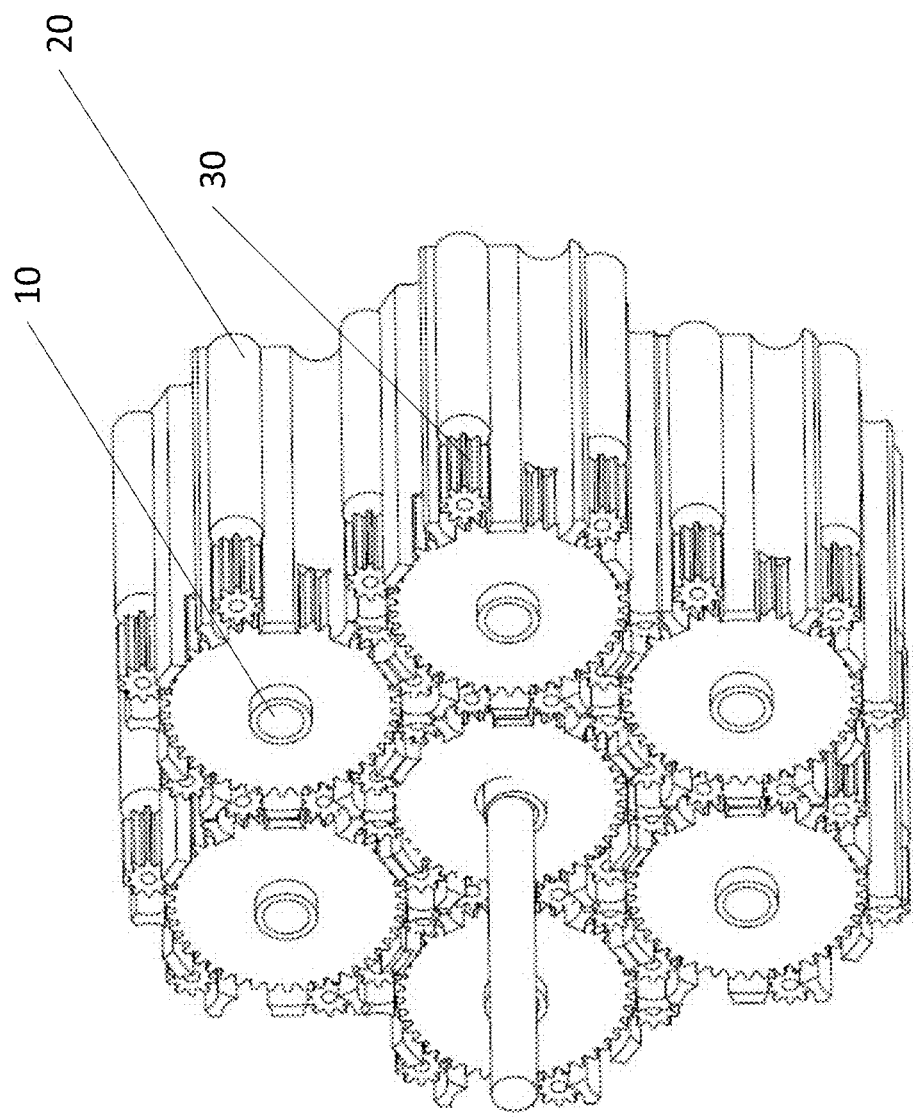
FIG. 9 schematically illustrates a top view of a multiple Attachable Module units engagement structure having gear mechanism according to some embodiments of the present invention.

FIG. 9 schematically illustrates a perspective view of a multiple engine cluster incorporating satellite gear units according to some embodiments of the present invention.

Figure 10:
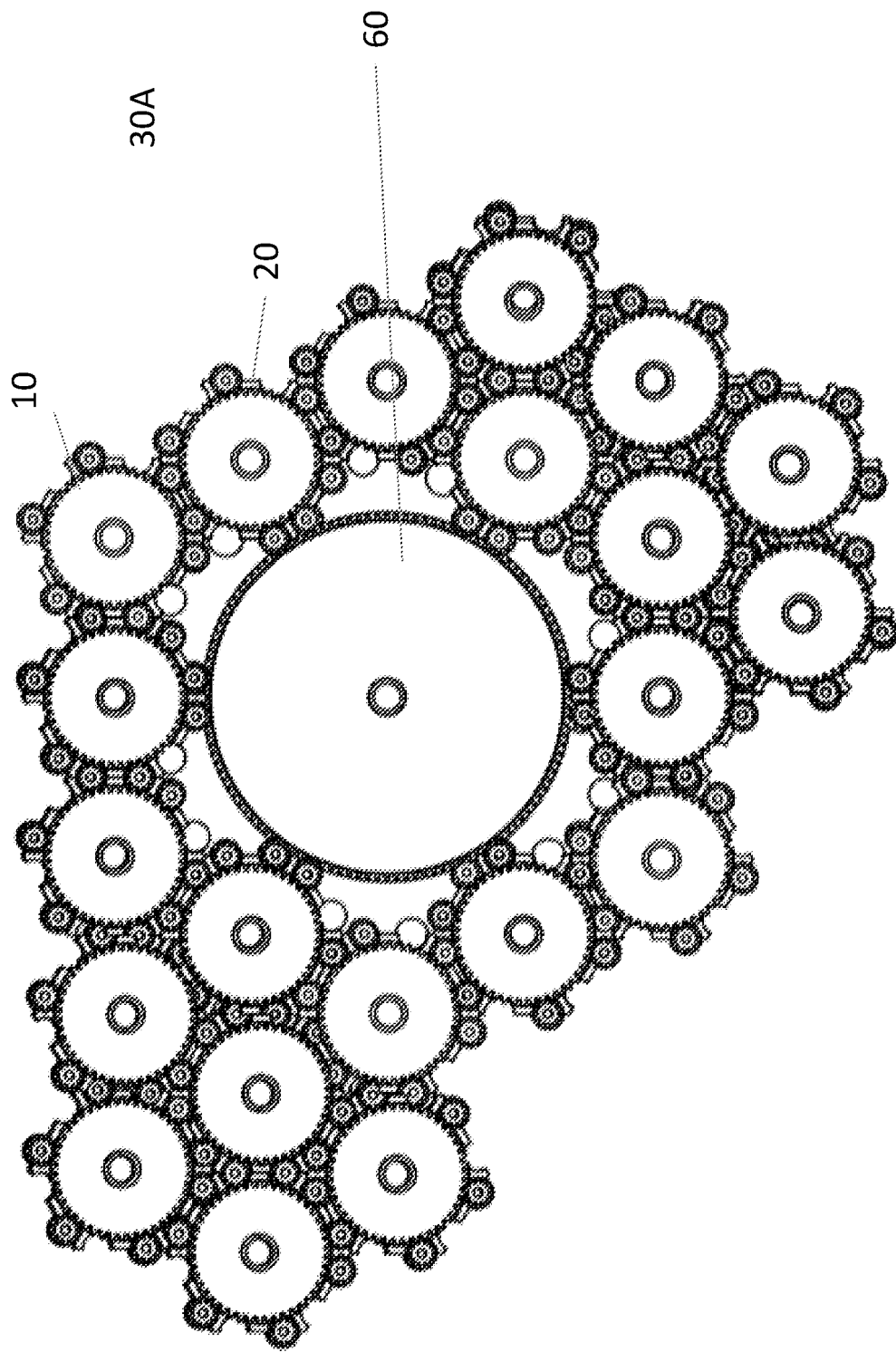
FIG. 10 schematically illustrates a top view of multiple Attachable Module units engagement structure having gear mechanism according to some embodiments of the present invention.

FIG. 10 schematically illustrates a top view of a multiple engine cluster incorporating satellite gear units according to some embodiments of the present invention. According to this embodiment, some Attachable Modules may incorporate rotatable gear units that are of different diameters than those of adjacent Attachable Modules. In this way the ratio of torque and speed transmission between adjacent engine units may be altered.

Figure 11:
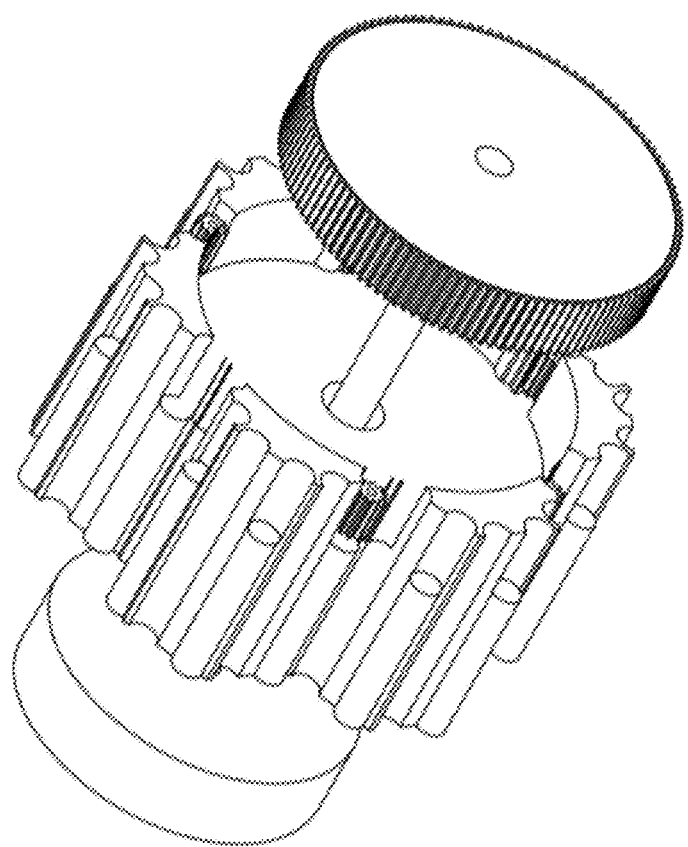
FIG. 11 schematically illustrates a perspective exploded view of a single Attachable Module unit according to some embodiments of the present invention.

FIG. 11 schematically illustrates perspective view of a single Attachable Module unit according to some embodiments of the present invention. According to this embodiment at least one Attachable Module unit incorporates a fractal shaped frame housing, thus facilitating the engagement of more than one gear at each face of the frame housing.

Figures 12, 12A:
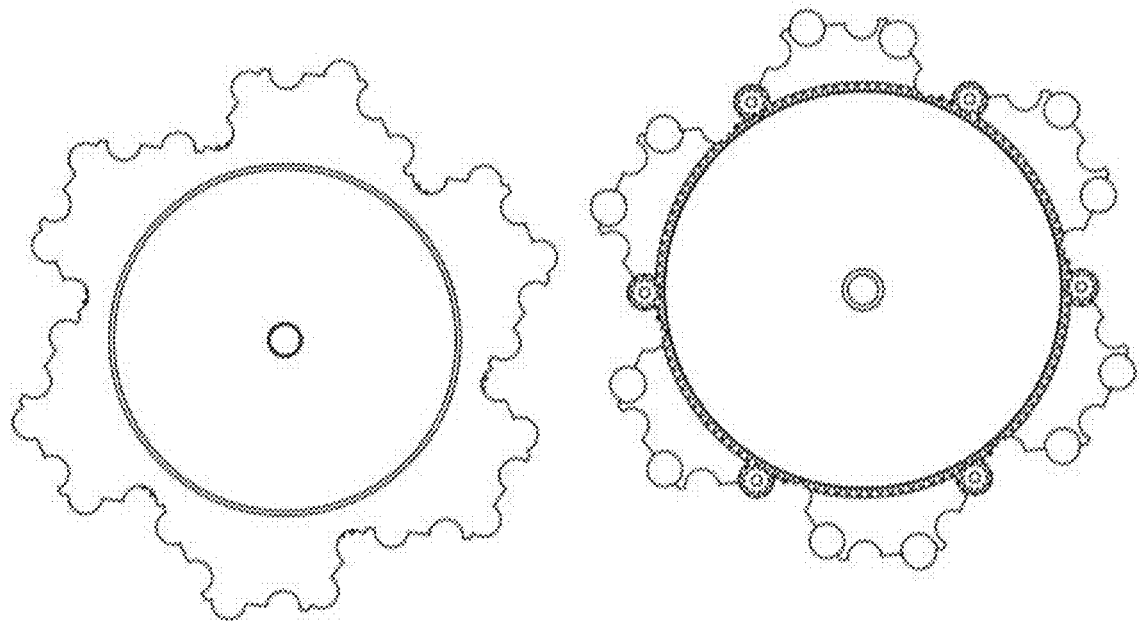
FIG. 12 schematically illustrates a top view of a single Attachable Module unit having gear mechanism according to some embodiments of the present invention.
FIG. 12A schematically illustrates a top view of a single Attachable Module unit having gear mechanism according to some embodiments of the present invention.

FIGS. 12 and 12A schematically illustrate top views of a single Attachable Module unit incorporating fractal shaped frame housing according to some embodiments of the present invention.

Figure 13:
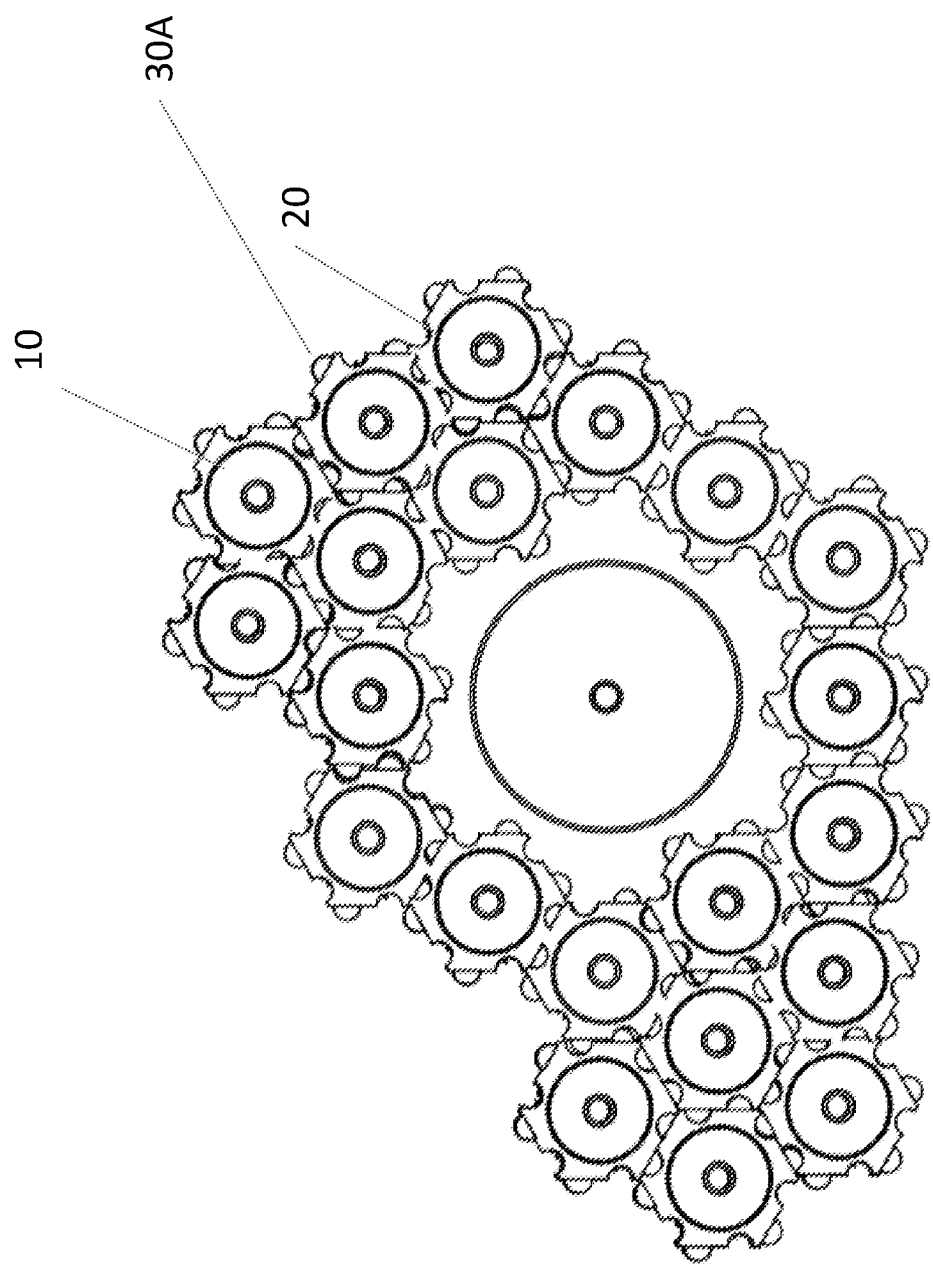
FIG. 13 schematically illustrates a top view of multiple Attachable Module units management structure having gear mechanism according to some embodiments of the present invention.

FIG. 13 schematically illustrates top view of a multi-engine cluster having friction mechanism according to some embodiments of the present invention.

According to this embodiment, at least one Attachable Module incorporates a rotatable gear unit of a larger diameter and a frame housing of fractal shape. It thus multiplies the number of adjacent Attachable Module's satellite friction gears that could engage its own main gear unit. In the given example, the number of adjacent Attachable Modules is 12, instead of 6.

Figure 14:
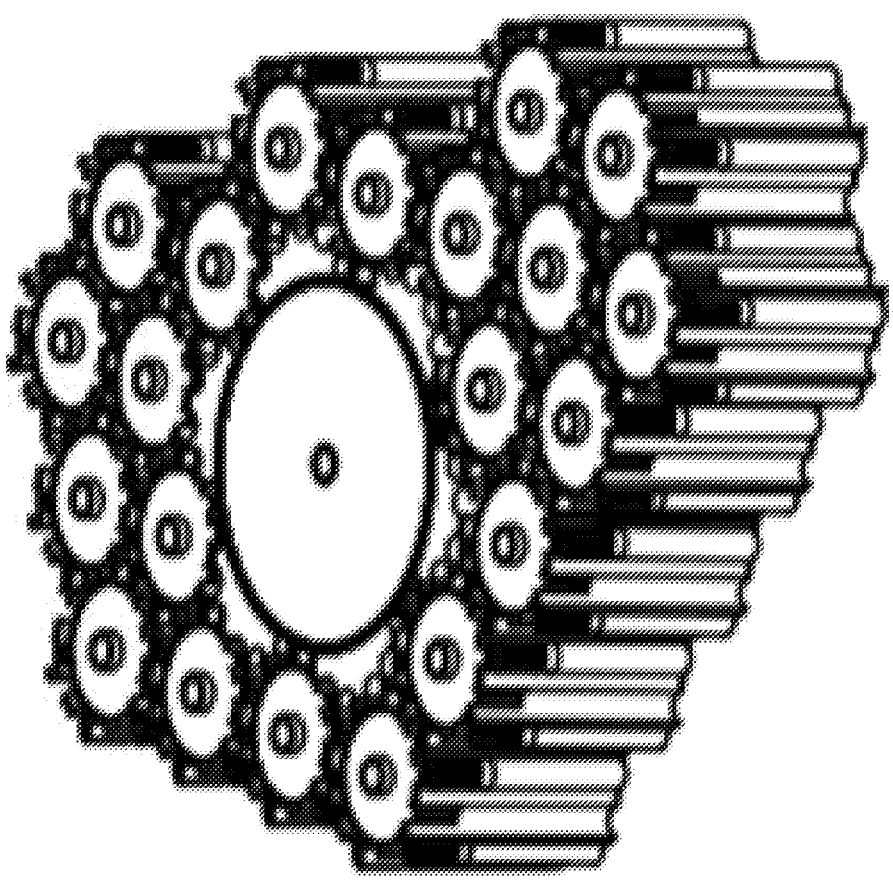
FIG. 14 schematically illustrates perspective view of multiple Attachable Module units engagement structure having gear mechanism according to some embodiments of the present invention. According to this embodiment, at least one Attachable module incorporates a rotatable member which is larger in diameter than that of adjacent Attachable modules.

FIG. 14 schematically illustrates perspective view of a multi-engine cluster having gear mechanism according to some embodiments of the present invention.

Figure 15:
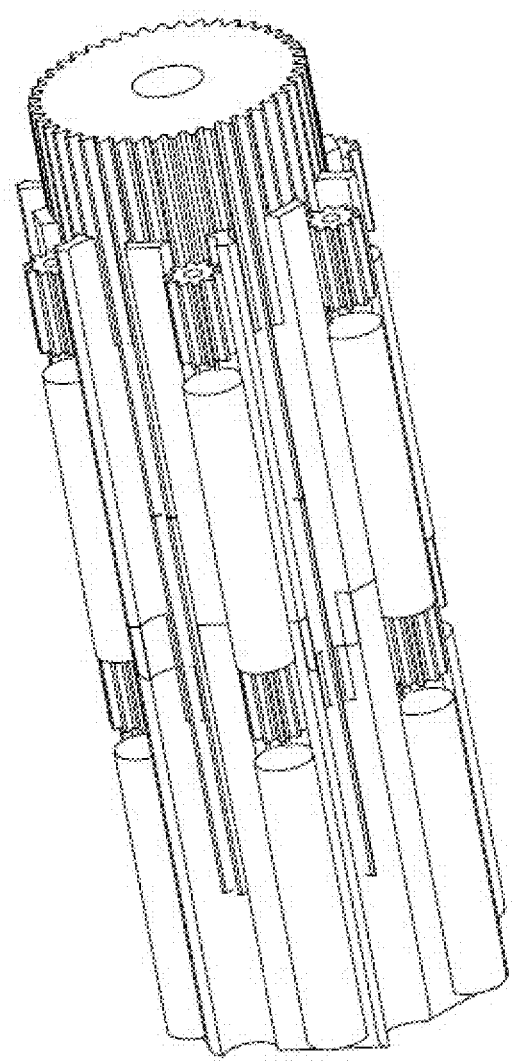
FIG. 15 schematically illustrates perspective view of a two engine units engagement structure having gear mechanism connected in row via the drive shaft, according to some embodiments of the present invention.

According to this embodiment, at least one Attachable Module incorporates a rotatable gear unit of a larger diameter and a frame housing of fractal shape. It thus multiplies the number of adjacent Attachable Module's satellite gears that could engage its own main gear unit. In the given example, the number of adjacent Attachable Modules is 12, instead of 6. FIG. 15 schematically illustrates a perspective view of an Attachable Module which incorporates at least two engine units, serially located one beneath the other, according to some embodiments of the present invention. The serially located engine units are optionally each individually engaged to satellite gear units, thus enabling attachment of adjacent Attachable Modules in different heights, in respect to each of the serially located engine units.

According to some embodiments of the present invention, at least one of the serially located engines is a dual shaft engine, thus transferring torque between the at least two engines and to a shaft drive connected to the upper-most engine.

According to some embodiments of the present invention, the said multi-engine cluster is comprised of an assembly of a plurality of Attachable Modules, each including at least one rotatable member such as a cogwheel or a set of cogwheels. Each rotatable member engages at least one other rotatable member of an adjacent Attachable Module such as to ultimately transfer torque thereof from all the engines within the engine cluster to at least one output drive shaft connected to at least one engine.

The rotatable member of at least one of the Attachable Modules of the system is located at a different height than at least one other rotatable member of another Attachable Module. The rotatable members of some Attachable Modules may engage such that the direction of rotation of at least two of the engaging Attachable Modules' rotatable members is opposite.

Some embodiments of the present invention differentiate between two types of Attachable Modules, henceforth referred to as 'Main' and 'Peripheral' Attachable Modules.

'Main' Attachable Modules comprise at least two rotatable members: at least one upper rotatable member and at least one lower rotatable member coaxially connected to the engine's drive shaft. The upper and lower rotatable members of the main Attachable Module are operatively associated via at least one transmission unit configured and located such as to transfer rotation of one upper or lower rotatable member to the other lower or upper rotatable member, respectively.

FIGS. 17A-17C presents the main Attachable Module unit 120 of a modular multi-engine cluster. The main Attachable Module unit 120 comprises:

A frame housing 15

At least one engine (hidden in FIGS. 17a-17c within the frame housing 15)

A drive shaft 122, protruding from the at least one engine on the 'x' axis

A gear unit, comprised of Upper and lower cogwheels 121 and 123 and a transmission cogwheel 130

The Upper and lower cogwheels 121 and 123 are mounted coaxially on the engines drive shaft, and rotate along the 'x' axis in opposite directions.

The Lower cogwheel 123 is directly attached to and rotates with the engine's drive shaft.

The upper and lower cogwheels 121 and 123 enable the transfer of torque between the main Attachable Module and cogwheels of adjacent peripheral Attachable Modules depending on the height thereof. Cogwheels 121 and 123 engage peripheral Attachable Modules cogwheels via an outer set of cogs; 121a and 123a respectively.

The transmission cogwheel 130 is located between the upper and lower cogwheels 121 and 123, such as to transfer torque between them. The transmission cogwheel 130 rotates along the 'z' axis, perpendicular to cogwheels 121 and 123. Cogwheel 130 engages cogwheels 121 and 123 through the slanted toothed extensions 121b and 123b respectively.

The frame housing 15 is connectable in any manner known in the art to one or more frame housings 115a of other peripheral Attachable modules respectively. In this example, the polygonal (hexagonal) unique shape of the frame housing 15 enables the formation of a multi-engine honeycomb shaped cluster by interlocking Attachable Modules to each another.

Reference is now made to FIGS. 19A-19C showing a peripheral Attachable Module 110a according to one embodiment of the present invention. The peripheral Attachable Module 110a comprises:

- A frame housing 115a
- At least one engine (hidden in FIGS. 19a-19c within the frame housing 115a)
- A drive shaft 112a, protruding from the at least one engine
- A gear unit 111a, comprised of at least one cogwheel which is directly attached and rotates with the drive shaft 112a.

According to one embodiment of the present invention, the gear unit 111a is height adjustable by having at least one stopper protrusion 118a attached to and protrude from an inner wall of its cogwheel 111a and by having an upper portion of the drive shaft 112a thereof having a grooved indentation 113a for allowing-the adjustment of the location of the cogwheel 111a over the drive shaft 112a and therefore the cogwheel's 111a height by allowing the protrusion 118a to be directed through the drive shaft grooved indentation 113a.

According to other embodiments, one of the elements of the drive shaft or the cogwheel inner wall of the peripheral Attachable Module's (110a) gear unit has a female screw threading indentation while the other element has a male screw thread.

According to some embodiments of the invention, at least an upper portion of each drive shaft of each peripheral Attachable Module's (110a) gear units has a groove such as a spiral groove e.g. a screw threading groove indented there over and each rotatable member has a corresponding protrusion indentation or protruding member attached thereto or designed there over for fitting into the indented groove at the drive shaft.

Means for fixating the desired height in a removable manner to allow readjustment of the cogwheel's height can be used.

Other mechanisms for enabling height adjustment of the rotatable members of the peripheral gear units can be used.

The frame housing 115a is connectable in any manner known in the art to one or more frame housings 15, 115a of other main or peripheral Attachable modules respectively. In this example, the polygonal (hexagonal) unique shape of the frame housing 115a enables the formation of a multi-engine honeycomb shaped cluster by interlocking Attachable Modules to each another.

FIG. 18 shows a modular multi-engine cluster 100 comprising a single main Attachable Module 120 and two peripheral Attachable Modules 110a, 110b.

FIG. 18 presents a simplified side view of a multi-engine cluster, incorporating three Attachable modules, according to some embodiments of the present invention.

- A main Attachable Module incorporating two co-axial rotatable members residing on separate planes, and engaged by a transmission gear unit
- A second Attachable Module incorporating a single rotating member, residing on one of the said planes, engaged to a respective rotatable member on the main Attachable Module, and rotating in a certain direction
- A third Attachable Module incorporating a single rotating member, residing on the other of the said planes, engaged to a respective rotatable member on the main Attachable Module, and rotating in the opposite direction.

It is clear to see from FIG. 18 that the cogwheel 111a of the peripheral Attachable Module 110a is located at the top edge of its drive shaft 112a, while the cogwheel 111b of the peripheral gear unit 110b is located at the lowest edge of its drive shaft 112b such that the first cogwheel 111a engages the upper cogwheel 121 of the main Attachable Module 120, while the second cogwheel 111b engages the lower cogwheel 123 of the main Attachable Module 120.

Figure 16B:
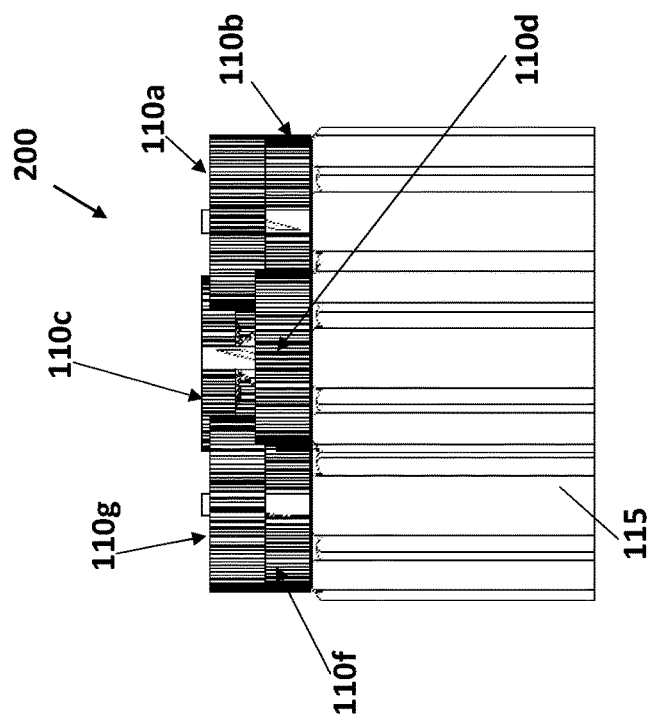
FIGS. 16A-16B show a cluster of Attachable Modules, according to some embodiments of the invention, incorporating multiple cogwheel gear units, each engaged to a separate engine via a drive shaft, where the system is designed to allow adjustment of the height of each cogwheel, to fit the requirements of the particular utility system it is designed to operate.
Figure 16A:
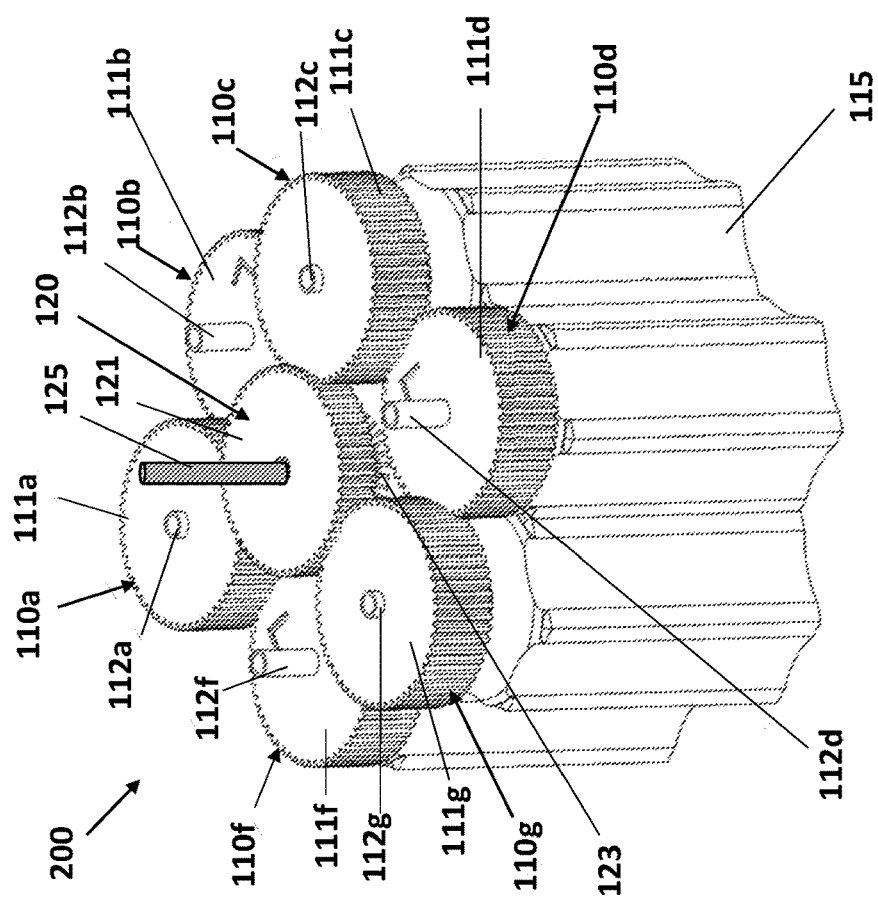

According to some embodiments of the present invention, all peripheral Attachable Module units share the same design, elements, shape and dimensions, as depicted in FIGS. 16A-16B and 18. According to other embodiments, the peripheral Attachable Module units vary in shape, size dimensions and elements. For example, some of the peripheral Attachable Modules can have a single cogwheel while others can have multiple cogwheels set as a gear unit having a carrier cogwheel and satellite cogwheels arrangement.

According to some embodiments, not all or none of the peripheral gear units may allow adjustment of the height of their cogwheel(s) and may only have one or more cogwheels or any other design of a rotating member set at a fixed height while the gear units' cogwheels height is different from at least one peripheral gear unit to at least one other peripheral gear unit.

Reference is now made to FIGS. 16A-16B showing a modular multi-engine cluster 200, according to some embodiments of the invention. The cluster 200 includes a support structure 115; multiple peripheral Attachable modules 110a-110g each incorporating a single cogwheel 111a-111g and a main Attachable module 120 having three cogwheels: an upper cogwheel 121, a lower cogwheel 123 and a transmission cogwheel 130 serving as a transmission mechanism for transferring torque from between the upper cogwheel 121 and the lower 123 cogwheel. Each Attachable module's cogwheel 111a-111g engages a respective engine within the Attachable module, through a respective drive shaft thereof 112a-112g and 122. The system 200 is designed to allow adjustment of the height of each cogwheel of each peripheral Attachable module thereof 110a-110g such as to enable placing the cogwheels 111a-111g at different heights in relation to one another as well as selecting the location and number of Attachable module is being used to fit requirements of the particular utility of the system Each cogwheel 111a-111g of each Attachable module engages one or more cogwheels of one or more adjacent Attachable module such as to ultimately combine the torque produced by all engines of the multi-engine cluster 200 to an output drive shaft 125.

The multi-engine cluster's output drive shaft may be associated with any of the Attachable modules, either main or peripheral. Moreover, according to some embodiments the cluster may comprise a plurality of output drive shafts 125, associated with multiple Attachable modules.

The torque emitted by the output drive shaft 125 may be conveyed either directly or via additional gears to power any other system, machine or contraption.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A modular multiengine system comprising: a plurality of instantly attachable modules, enabling instant, flexible, configurable assembly and shaping of a multiple-engine cluster, each attachable module comprising:
 a. at least one electric engine, and
 b. at least one rotatable gear unit driven by the said at least one electric engine through a drive shaft, and
 c. a frame housing, encompassing the said at least one electric engine and the at least one rotatable gear unit,
 wherein the frame housings facilitates the of the attachable modules facilitate instant attachment of adjacent attachable modules through their respective frame housings,
 wherein one of the attachable modules is a main attachable module in which the gear unit comprises three rotatable members: at least one upper rotatable member and at least one lower rotatable member, and at least one transmission unit serving as a transmission mechanism for transferring torque between the upper rotatable member and the lower rotatable member,
 wherein each of the upper and lower rotatable members of the main attachable module engages at least one other adjacent rotatable member in an adjacent Attachable Module, such as to ultimately transfer torque from all the electric engines operable in said modular multiengine system to an output drive shaft connected to the gear unit of the main attachable module,
 wherein a rotatable member of at least one first adjacent attachable module engages a respective rotatable member of the main attachable module and rotates in a certain direction and wherein a rotatable member of at least one second adjacent attachable module engages a respective rotatable member of the main attachable module and rotates in an opposite direction from the certain direction.

2. The system of claim 1, wherein the transmission unit engages the lower and upper rotatable members through slanted toothed extensions.

3. The system of claim 1, wherein one of the adjacent Attachable Modules which incorporates said rotatable gear unit, of which the height is adjustable by having at least one stopper pin attached to an inner wall of its a cogwheel, and by having an upper portion of its drive shaft grooved for allowing the adjustment of the location of the rotatable member over the drive shaft, and therefore the cogwheel height by allowing the pin to be directed through the drive shaft groove.

4. The system of claim 1, wherein the said frame housing is constructed as a regular polygon, facilitating the repetitive attachment of attachable modules to construct a repetitive modular structure.

5. The system of claim 1, wherein the rotatable members are friction wheels or toothed gear wheels and torque is transferred between members and main rotatable gear units by friction wheels, toothed gear wheels, or any combination thereof.

* * * * *